(12) United States Patent
Kook et al.

(10) Patent No.: US 10,612,627 B2
(45) Date of Patent: Apr. 7, 2020

(54) VEHICLE TRANSMISSION

(71) Applicants: Hyundai Motor Company, Seoul (KR); Kia Motors Corporation, Seoul (KR)

(72) Inventors: Jae Chang Kook, Gyeonggi-do (KR); Jin Ho Kim, Gyeonggi-do (KR); Seong Wook Hwang, Gyeonggi-do (KR); Seong Wook Ji, Gyeonggi-do (KR); Woo Churl Son, Gyeonggi-do (KR); Won Min Cho, Gyeonggi-do (KR); Hyun Sik Kwon, Seoul (KR); Jong Sool Park, Gyeonggi-do (KR); Woo Jin Chang, Gyeonggi-do (KR); Dong Hwan Hwang, Seoul (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 222 days.

(21) Appl. No.: 15/833,114

(22) Filed: Dec. 6, 2017

(65) Prior Publication Data
US 2018/0363737 A1  Dec. 20, 2018

(30) Foreign Application Priority Data
Jun. 19, 2017 (KR) .......... 10-2017-0077038

(51) Int. Cl.
*F16H 3/66* (2006.01)

(52) U.S. Cl.
CPC .............. *F16H 3/666* (2013.01); *F16H 3/66* (2013.01); *F16H 3/663* (2013.01); *F16H 2200/0069* (2013.01); *F16H 2200/2002* (2013.01); *F16H 2200/2012* (2013.01); *F16H 2200/2015* (2013.01); *F16H 2200/2046* (2013.01)

(58) Field of Classification Search
CPC . F16H 3/666; F16H 3/66; F16H 3/663; F16H 2200/2012; F16H 2200/2015; F16H 2200/2002; F16H 2200/0069; F16H 2200/2046; F16H 2200/0082; F16H 2057/02043; F16H 2057/02095; F16H 57/023
See application file for complete search history.

(56) References Cited

FOREIGN PATENT DOCUMENTS

KR  2013-0003981 A  1/2013

*Primary Examiner* — Jeffrey A Shapiro
(74) *Attorney, Agent, or Firm* — Mintz Levin Cohn Ferris Glovsky and Popeo, P.C.; Peter F. Corless

(57) ABSTRACT

A vehicle transmission is provided that improves fuel efficiency through multiple speed stages and enhances silent drivability of a vehicle using an operating point in a low RPM range of an engine. The vehicle transmission combines three simple planetary gear units with a single compound planetary gear set or combines five simple planetary gear units to shift gears while changing rotational speeds and directions by a selective intermittence operation using rotation elements of the planetary gear units and a plurality of friction elements. Through such a shift operation, it is possible to form at least forward 10-speed or more and reverse 1-speed gear ratios for driving of the vehicle.

14 Claims, 7 Drawing Sheets

FIG. 11

| GEAR | C1 | B1 | B2 | C2 | C3 | C4 | GEAR RATIO |
|---|---|---|---|---|---|---|---|
| 1ST | ● | ● | ● | ○ | | | 5.100 |
| | ● | ● | ● | | ○ | | 5.100 |
| | ● | ● | ● | | | ○ | 5.100 |
| 2ND | | ● | ● | ● | | ● | 3.211 |
| 3RD | ● | | ● | ● | | ● | 2.113 |
| 4TH | | | ● | ● | ● | ● | 1.704 |
| 5TH | ● | | ● | ● | ● | | 1.488 |
| 6TH | ● | | ● | | ● | ● | 1.269 |
| 7TH | ● | | | ● | ● | ● | 1.000 |
| 8TH | ● | ● | | | ● | ● | 0.843 |
| 9TH | ● | ● | | ● | ● | | 0.686 |
| 10TH | | ● | | ● | ● | ● | 0.630 |
| R1 | | ● | ● | | ● | ● | −4.921 |

VEHICLE TRANSMISSION

CROSS REFERENCE TO RELATED APPLICATION

The present application claims priority of Korean Patent Application No. 10-2017-0077038 filed on Jun. 19, 2017, the entire contents of which is incorporated herein for all purposes by this reference.

BACKGROUND

Field of the Invention

The present invention relates to a vehicle transmission, and more particularly, to a vehicle transmission that improves fuel efficiency through multiple speed stages and of enhances silent drivability of a vehicle using an operating point in a low revolutions per minute (RPM) range of an engine.

Description of the Related Art

In recent years, an increase in oil price has caused automobile manufacturers to develop techniques for improving fuel efficiency. In the case of an engine, these manufacturers have been pursuing efforts to reduce weight and improve fuel efficiency in a vehicle by downsizing of the engine. In the case of an automatic transmission, it is possible to simultaneously secure drivability and fuel efficiency competitiveness through multiple speed stages of the automatic transmission from among various methods of improving fuel efficiency.

However, in the case of the automatic transmission, as the number of speed stages increases, the number of internal parts also increases. Hence, the automatic transmission may be difficult to mount, the manufacturing cost and weight may be increased, and power transmission efficiency may deteriorate. Accordingly, to increase an effect of improving fuel efficiency by multiple speed stages, the development of a gear train structure capable of maximizing efficiency with a reduced number of parts is important.

The foregoing is intended merely to aid in the understanding of the background of the present invention, and is not intended to mean that the present invention falls within the purview of the related art that is already known to those skilled in the art.

SUMMARY

Accordingly, the present invention provides a vehicle transmission capable of improving fuel efficiency through multiple speed stages and of enhancing silent drivability of a vehicle using an operating point in a low RPM range of an engine.

In accordance with one aspect of the present invention, a vehicle transmission may include a first planetary gear unit, a second planetary gear unit, a third planetary gear unit, and a compound planetary gear set, each of them having three or more rotation elements, wherein the first planetary gear unit may include a first rotation element directly connected to a first rotation element of the second planetary gear unit while being selectively operated as a fixed element, a second rotation element directly connected to a third rotation element of the compound planetary gear set, and a third rotation element selectively operated a fixed element, the second planetary gear unit may include a second rotation element selectively connected to a first rotation element of the compound planetary gear set while being directly connected to an input shaft, and the compound planetary gear set may include a second rotation element directly connected to an output shaft. The vehicle transmission may include a plurality of friction elements connected to at least one of the rotation elements of the planetary gear units to adjust rotation of the connected rotation element.

In each of the first to third planetary gear units, the first rotation element may be a sun gear, the second rotation element may be a carrier, and the third rotation element may be a ring gear. In the compound planetary gear set, the first rotation element may be a sun gear, the second rotation element may be a carrier, and the third and fourth rotation elements may be respective ring gears engaged to the carrier.

The compound planetary gear set may include a fourth planetary gear unit and a fifth planetary gear unit. The first rotation element of the compound planetary gear set may be configured by directly connecting a sun gear of the fourth planetary gear unit to a sun gear of the fifth planetary gear unit, and the second rotation element of the compound planetary gear set may be configured by directly connecting a carrier of the fourth planetary gear unit to a carrier of the fifth planetary gear unit. The third rotation element of the compound planetary gear set may be a ring gear of the fourth planetary gear unit, and the fourth rotation element of the compound planetary gear set may be a ring gear of the fifth planetary gear unit.

A third rotation element of the second planetary gear unit may be selectively connected to a second rotation element of the third planetary gear unit, and the second rotation element of the third planetary gear unit may be selectively connected to a fourth rotation element of the compound planetary gear set. The third rotation element of the second planetary gear unit may be selectively connected to a first rotation element of the third planetary gear unit, and a third rotation element of the third planetary gear unit may be directly connected to a first rotation element of the compound planetary gear set.

In particular, the friction elements may include a first brake selectively connected between the first rotation element of the first planetary gear unit and a transmission case, a second brake selectively connected between the third rotation element of the first planetary gear unit and the transmission case, a first clutch selectively connected between the second rotation element of the second planetary gear unit and the first rotation element of the compound planetary gear set, a second clutch selectively connected between the third rotation element of the second planetary gear unit and the second rotation element of the third planetary gear unit, a third clutch selectively connected between the second rotation element of the third planetary gear unit and the fourth rotation element of the compound planetary gear set, and a fourth clutch selectively connected between the third rotation element of the second planetary gear unit and the first rotation element of the third planetary gear unit. The third rotation element of the second planetary gear unit may be directly connected to a first rotation element of the third planetary gear unit, and a third rotation element of the third planetary gear unit may be selectively connected to a first rotation element of the compound planetary gear set.

Additionally, the friction elements may include a first brake selectively connected between the first rotation element of the first planetary gear unit and a transmission case, a second brake selectively connected between the third rotation element of the first planetary gear unit and the transmission case, a first clutch selectively connected between the second rotation element of the second planetary gear unit and the first rotation element of the compound planetary gear set, a second clutch selectively connected between the third rotation element of the second planetary gear unit and the second rotation element of the third planetary gear unit, a third clutch selectively connected between the second rotation element of the third planetary gear unit and the fourth rotation element of the compound planetary gear set, and a fourth clutch selectively connected between the third rotation element of the third planetary gear unit and the first rotation element of the compound planetary gear set.

A third rotation element of the second planetary gear unit may be directly connected to a first rotation element of the third planetary gear unit, the third rotation element of the second planetary gear unit may be selectively connected to a second rotation element of the third planetary gear unit, and the second rotation element of the third planetary gear unit may be selectively connected to a fourth rotation element of the compound planetary gear set. A third rotation element of the third planetary gear unit may be selectively connected to a first rotation element of the compound planetary gear set.

In particular, the friction elements may include a first brake selectively connected between the first rotation element of the first planetary gear unit and a transmission case, a second brake selectively connected between the third rotation element of the first planetary gear unit and the transmission case, a first clutch selectively connected between the second rotation element of the second planetary gear unit and the first rotation element of the compound planetary gear set, a second clutch selectively connected between the third rotation element of the second planetary gear unit and the third rotation element of the third planetary gear unit, a third clutch selectively connected between the second rotation element of the third planetary gear unit and the fourth rotation element of the compound planetary gear set, and a fourth clutch selectively connected between the third rotation element of the third planetary gear unit and the first rotation element of the compound planetary gear set.

A third rotation element of the second planetary gear unit may be directly connected to a first rotation element of the third planetary gear unit, a second rotation element of the third planetary gear unit may be selectively connected to a third rotation element of the third planetary gear unit, and the second rotation element of the third planetary gear unit may be selectively connected to a fourth rotation element of the compound planetary gear set. The third rotation element of the third planetary gear unit may be selectively connected to a first rotation element of the compound planetary gear set.

In particular, the friction elements may include a first brake selectively connected between the first rotation element of the first planetary gear unit and a transmission case, a second brake selectively connected between the third rotation element of the first planetary gear unit and the transmission case, a first clutch selectively connected between the second rotation element of the second planetary gear unit and the first rotation element of the compound planetary gear set, a second clutch selectively connected between the second rotation element of the third planetary gear unit and the third rotation element of the third planetary gear unit, a third clutch selectively connected between the second rotation element of the third planetary gear unit and the fourth rotation element of the compound planetary gear set, and a fourth clutch selectively connected between the third rotation element of the third planetary gear unit and the first rotation element of the compound planetary gear set.

A third rotation element of the second planetary gear unit may be selectively connected to a first rotation element of the third planetary gear unit, the third rotation element of the second planetary gear unit may be selectively connected to a third rotation element of the third planetary gear unit, and a second rotation element of the third planetary gear unit may be directly connected to a fourth rotation element of the compound planetary gear set. The third rotation element of the third planetary gear unit may be selectively connected to a first rotation element of the compound planetary gear set.

In particular, the friction elements may include a first brake selectively connected between the first rotation element of the first planetary gear unit and a transmission case, a second brake selectively connected between the third rotation element of the first planetary gear unit and the transmission case, a first clutch selectively connected between the second rotation element of the second planetary gear unit and the first rotation element of the compound planetary gear set, a second clutch selectively connected between the third rotation element of the second planetary gear unit and the third rotation element of the third planetary gear unit, a third clutch selectively connected between the third rotation element of the second planetary gear unit and the first rotation element of the third planetary gear unit, and a fourth clutch selectively connected between the third rotation element of the third planetary gear unit and the first rotation element of the compound planetary gear set.

In accordance with another aspect of the present invention, a vehicle transmission may include a first planetary gear unit, a second planetary gear unit, a third planetary gear unit, and a compound planetary gear set, each of them having three or more rotation elements, an input shaft connected to a second rotation element of the second planetary gear unit, and a first clutch, a first shaft connected to a first brake, a first rotation element of the first planetary gear unit, and a first rotation element of the second planetary gear unit, a second shaft connected to a second brake, and a third rotation element of the first planetary gear unit, a third shaft connected to a second rotation element of the first planetary gear unit, and a third rotation element of the compound planetary gear set, a fourth shaft connected to the first clutch, and a first rotation element of the compound planetary gear set, and an output shaft connected to a second rotation element of the compound planetary gear set.

The fourth shaft may be further connected to a third rotation element of the third planetary gear unit. The vehicle transmission may further include a fifth shaft connected to a third rotation element of the second planetary gear unit, a second clutch, and a fourth clutch, a sixth shaft connected to the fourth clutch, and a first rotation element of the third planetary gear unit, a seventh shaft connected to the second clutch, a second rotation element of the third planetary gear unit, and a third clutch, and an eighth shaft connected to the third clutch, and a fourth rotation element of the compound planetary gear set.

The first brake may be selectively connected between the first shaft and a transmission case. The second brake may be selectively connected between the second shaft and the transmission case. The first clutch may be selectively connected between the input shaft and the fourth shaft. The second clutch may be selectively connected between the fifth shaft and the seventh shaft. The third clutch may be selectively connected between the seventh shaft and the eighth shaft. The fourth clutch may be selectively connected between the fifth shaft and the sixth shaft.

The first brake may be selectively connected between the first rotation element of the first planetary gear unit and the transmission case. The second brake may be selectively connected between the third rotation element of the first planetary gear unit and the transmission case. The first clutch may be selectively connected between the second rotation element of the second planetary gear unit and the third rotation element of the third planetary gear unit. The second clutch may be selectively connected between the third rotation element of the second planetary gear unit and the second rotation element of the third planetary gear unit The third clutch may be selectively connected between the second rotation element of the third planetary gear unit and the fourth rotation element of the compound planetary gear set. The fourth clutch may be selectively connected between the third rotation element of the second planetary gear unit and the first rotation element of the third planetary gear unit.

The fourth shaft may be further connected to a fourth clutch. The vehicle transmission may further include a fifth shaft connected to a third rotation element of the second planetary gear unit, a second clutch, and a first rotation element of the third planetary gear unit, a sixth shaft connected to a third rotation element of the third planetary gear unit, and the fourth clutch, a seventh shaft connected to the second clutch, a second rotation element of the third planetary gear unit, and a third clutch, and an eighth shaft connected to the third clutch, and a fourth rotation element of the compound planetary gear set.

The first brake may be selectively connected between the first shaft and a transmission case. The second brake may be selectively connected between the second shaft and the transmission case. The first clutch may be selectively connected between the input shaft and the fourth shaft. The second clutch may be selectively connected between the fifth shaft and the seventh shaft. The third clutch may be selectively connected between the seventh shaft and the eighth shaft. The fourth clutch may be selectively connected between the fourth shaft and the sixth shaft.

The first brake may be selectively connected between the first rotation element of the first planetary gear unit and the transmission case. The second brake may be selectively connected between the third rotation element of the first planetary gear unit and the transmission case. The first clutch may be selectively connected between the second rotation element of the second planetary gear unit and the first rotation element of the compound planetary gear set. The second clutch may be selectively connected between the third rotation element of the second planetary gear unit and the second rotation element of the third planetary gear unit. The third clutch may be selectively connected between the second rotation element of the third planetary gear unit and the fourth rotation element of the compound planetary gear set. The fourth clutch may be selectively connected between the third rotation element of the third planetary gear unit and the first rotation element of the compound planetary gear set.

The fourth shaft may be further connected to a fourth clutch. The vehicle transmission may further include a fifth shaft connected to a third rotation element of the second planetary gear unit, a second clutch, and a first rotation element of the third planetary gear unit, a sixth shaft connected to the second clutch, a third rotation element of the third planetary gear unit, and the fourth clutch, a seventh shaft connected to a second rotation element of the third planetary gear unit, and a third clutch, and an eighth shaft connected to the third clutch, and a fourth rotation element of the compound planetary gear set.

The first brake may be selectively connected between the first shaft and a transmission case. The second brake may be selectively connected between the second shaft and the transmission case. The first clutch may be selectively connected between the input shaft and the fourth shaft. The second clutch may be selectively connected between the fifth shaft and the sixth shaft. The third clutch may be selectively connected between the seventh shaft and the eighth shaft. The fourth clutch may be selectively connected between the fourth shaft and the sixth shaft.

The first brake may be selectively connected between the first rotation element of the first planetary gear unit and the transmission case. The second brake may be selectively connected between the third rotation element of the first planetary gear unit and the transmission case. The first clutch may be selectively connected between the second rotation element of the second planetary gear unit and the first rotation element of the compound planetary gear set. The second clutch may be selectively connected between the third rotation element of the second planetary gear unit and the third rotation element of the third planetary gear unit The third clutch may be selectively connected between the second rotation element of the third planetary gear unit and the fourth rotation element of the compound planetary gear set. The fourth clutch may be selectively connected between the third rotation element of the third planetary gear unit and the first rotation element of the compound planetary gear set.

The fourth shaft may be further connected to a fourth clutch. The vehicle transmission may further include a fifth shaft connected to a third rotation element of the second planetary gear unit, and a first rotation element of the third planetary gear unit, a sixth shaft connected to a third rotation element of the third planetary gear unit, a second clutch, and the fourth clutch, a seventh shaft connected to a second rotation element of the third planetary gear unit, the second clutch, and a third clutch, and an eighth shaft connected to the third clutch, and a fourth rotation element of the compound planetary gear set.

The first brake may be selectively connected between the first shaft and a transmission case. The second brake may be selectively connected between the second shaft and the transmission case. The first clutch may be selectively connected between the input shaft and the fourth shaft. The second clutch may be selectively connected between the sixth shaft and the seventh shaft. The third clutch may be selectively connected between the seventh shaft and the eighth shaft. The fourth clutch may be selectively connected between the fourth shaft and the sixth shaft.

The first brake may be selectively connected between the first rotation element of the first planetary gear unit and the transmission case. The second brake may be selectively connected between the third rotation element of the first planetary gear unit and the transmission case. The first clutch may be selectively connected between the second rotation element of the second planetary gear unit and the first rotation element of the compound planetary gear set. The second clutch may be selectively connected between the third rotation element of the second planetary gear unit and the third rotation element of the third planetary gear unit The third clutch may be selectively connected between the second rotation element of the third planetary gear unit and the fourth rotation element of the compound planetary gear set. The fourth clutch may be selectively connected between the third rotation element of the third planetary gear unit and the first rotation element of the compound planetary gear set.

The fourth shaft may be further connected to a fourth clutch. The vehicle transmission may further include a fifth shaft connected to a third rotation element of the second planetary gear unit, a second clutch, and a third clutch, a sixth shaft connected to the second clutch, a third rotation element of the third planetary gear unit, and the fourth clutch, a seventh shaft connected to the third clutch, and a first rotation element of the third planetary gear unit, and an eighth shaft connected to a second rotation element of the third planetary gear unit, and a fourth rotation element of the compound planetary gear set.

The first brake may be selectively connected between the first shaft and a transmission case. The second brake may be selectively connected between the second shaft and the transmission case. The first clutch may be selectively connected between the input shaft and the fourth shaft. The second clutch may be selectively connected between the fifth shaft and the sixth shaft. The third clutch may be selectively connected between the fifth shaft and the seventh shaft. The fourth clutch may be selectively connected between the fourth shaft and the sixth shaft.

The first brake may be selectively connected between the first rotation element of the first planetary gear unit and the transmission case. The second brake may be selectively connected between the third rotation element of the first planetary gear unit and the transmission case. The first clutch may be selectively connected between the second rotation element of the second planetary gear unit and the first rotation element of the compound planetary gear set. The second clutch may be selectively connected between the third rotation element of the second planetary gear unit and the third rotation element of the third planetary gear unit. The third clutch may be selectively connected between the third rotation element of the second planetary gear unit and the first rotation element of the third planetary gear unit. The fourth clutch may be selectively connected between the third rotation element of the third planetary gear unit and the first rotation element of the compound planetary gear set.

As apparent from the above description, the vehicle transmission according to the present invention is capable of combining three simple planetary gear units with a single compound planetary gear set or combining five simple planetary gear units to shift gears while changing rotational speeds and directions by a selective operation using rotation elements of the planetary gear units and a plurality of friction elements. Through such a shift operation, it may be possible to form at least forward 10-speed or more and reverse 1-speed gear ratios for driving of the vehicle. Thus, it may be possible to improve fuel efficiency through multiple speed stages of the automatic transmission and to enhance silent drivability of the vehicle using the operating point in the low RPM range of the engine.

BRIEF DESCRIPTION OF THE DRAWINGS

The above and other objects, features and advantages of the present invention will be more clearly understood from the following detailed description taken in conjunction with the accompanying drawings, in which:

FIG. 11 is an operation table for each speed stage of the transmission according to the first to fifth exemplary embodiments of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The exemplary embodiments of the present invention will be described below with reference to the accompanying drawings.

A vehicle transmission according to the present invention may include a first planetary gear unit PG1, a second planetary gear unit PG2, a third planetary gear unit PG3, and a compound planetary gear set CPG, and three or more rotation elements may be rotatably disposed in each of the gear units.

Figure 1:
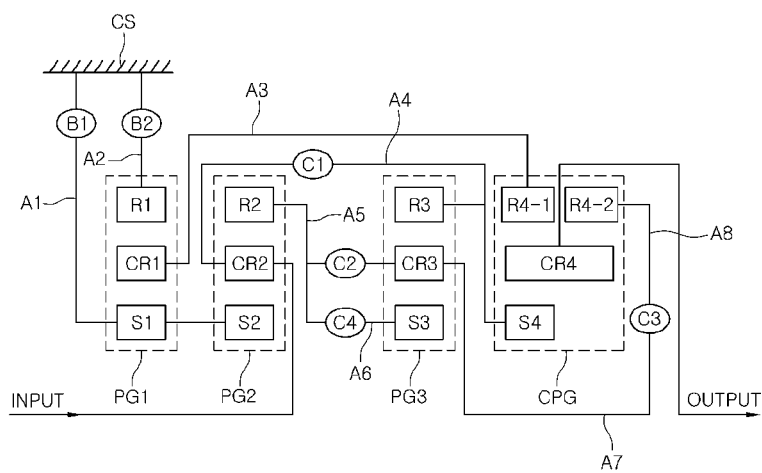
FIG. 1 is a diagram illustrating a structure of a vehicle transmission according to a first exemplary embodiment of the present invention.

FIG. 1 is a diagram illustrating a structure of a vehicle transmission according to a first exemplary embodiment of the present invention. Referring to the drawing, a first rotation element of a first planetary gear unit PG1 may be selectively operated as a fixed element and be directly connected (e.g., connected in series) to a first rotation element of a second planetary gear unit PG2. For example, the first rotation element of the first planetary gear unit PG1 may be a first sun gear S1, and the first sun gear S1 may be selectively connected to a transmission case CS by a friction element.

The first rotation element of the second planetary gear unit PG2 may be a second sun gear S2, and the first sun gear S1 may be directly connected to (e.g., connected in series) the second sun gear S2. In particular, the first and second planetary gear units PG1 and PG2 and a third planetary gear unit PG3 to be described later may each be a single pinion planetary gear unit. The respective first rotation elements of the gear units may be first, second, and third sun gears, the respective second rotation elements of the gear units may be first, second, and third carriers, and the respective third rotation elements of the gear units may be first, second, and third ring gears.

Figure 2:
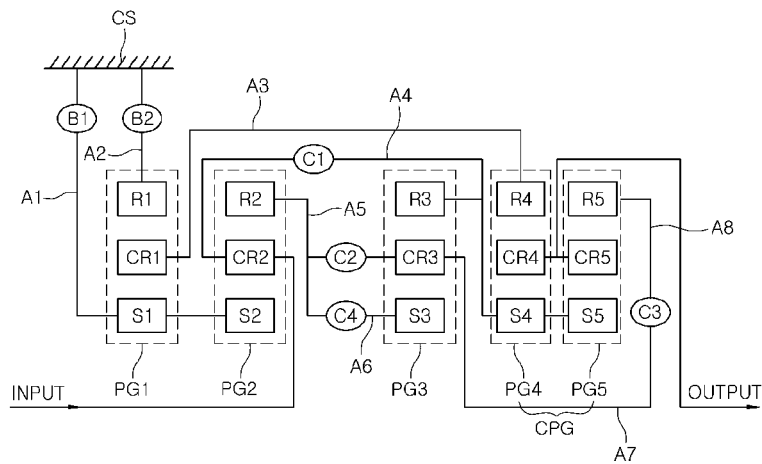
FIG. 2 is a diagram illustrating a modified structure of a compound planetary gear set in the structure of the first exemplary embodiment of the present invention illustrated in FIG. 1.

In addition, the second rotation element of the first planetary gear unit PG1 may be directly connected to (e.g., connected in series) a third rotation element of a compound planetary gear set CPG. For example, the second rotation element of the first planetary gear unit PG1 may be a first carrier CR1. The third rotation element of the compound planetary gear set CPG may be a fourth-first ring gear R4-1 as shown in FIG. 1, or may be a fourth ring gear R4 as shown in FIG. 2. The first carrier CR1 may be directly connected to (e.g., connected in series) the fourth-first ring gear R4-1 or the fourth ring gear R4.

The third rotation element of the first planetary gear unit PG1 may be selectively operated as a fixed element. For example, the third rotation element of the first planetary gear unit PG1 may be a first ring gear R1, and the first ring gear R1 may be selectively connected to the transmission case CS by a friction element. Particularly, the compound planetary gear set CPG may be a single compound planetary gear set as shown in FIG. 1 or may be a compound planetary gear set formed by a combination of two planetary gear units as shown in FIG. 2. For example, as shown in FIG. 1, the first rotation element of the compound planetary gear set CPG may be a fourth sun gear S4, the second rotation element thereof may be a fourth carrier CR4, and the respective third and fourth rotation elements thereof may be a fourth-first ring gear R4-1 and a fourth-second ring gear R4-2 which are engaged to the fourth carrier CR4.

As shown in FIG. 2, the compound planetary gear set CPG may include a combination of fourth and fifth planetary gear units PG4 and PG5 as a single pinion planetary gear unit. In other words, the first rotation element of the compound planetary gear set CPG may be configured by directly connecting a fourth sun gear S4 of the fourth planetary gear unit PG4 to a fifth sun gear S5 of the fifth planetary gear unit PG5. The second rotation element of the compound planetary gear set CPG may be configured by directly connecting a fourth carrier CR4 of the fourth planetary gear unit PG4 to a fifth carrier CR5 of the fifth planetary gear unit PG5. The third rotation element of the compound planetary gear set CPG may be a fourth ring gear R4 of the fourth planetary gear unit PG4, and the fourth rotation element of the compound planetary gear set CPG may be a fifth ring gear R5 of the fifth planetary gear unit PG5. The directly connecting of the components as described herein may refer to a series connection.

The modified structure of the compound planetary gear set CPG is applicable to all transmission structures according to second to fifth exemplary embodiments to be described later. Therefore, the redundant description of the structure of the compound planetary gear set CPG will be omitted below.

In the transmission structure of FIG. 1 according to the first exemplary embodiment, the second rotation element of the second planetary gear unit PG2 may be directly connected to an input shaft INPUT, and may be selectively connected to the first rotation element of the compound planetary gear set CPG. For example, the second rotation element of the second planetary gear unit PG2 may be a second carrier CR2, and be directly connected to the input shaft INPUT to be operated as an input element. The first rotation element of the compound planetary gear set CPG may be a fourth sun gear S4, and the second carrier CR2 may be selectively connected to the fourth sun gear S4 by a friction element. The third rotation element of the second planetary gear unit PG2 may be connected to the first rotation element of the third planetary gear unit PG3, and the third rotation element of the second planetary gear unit PG2 may be connected to the second rotation element of the third planetary gear unit PG3.

For example, the third rotation element of the second planetary gear unit PG2 may be a second ring gear R2, and the first rotation element of the third planetary gear unit PG3 may be a third sun gear S3. The second ring gear R2 may be selectively connected to the third sun gear S3 by a friction element. In addition, the second rotation element of the third planetary gear unit PG3 may be a third carrier CR3, and the second ring gear R2 may be selectively connected to the third carrier CR3 by a friction element.

The second rotation element of the third planetary gear unit PG3 may be selectively connected to the fourth rotation element of the compound planetary gear set CPG. For example, the fourth rotation element of the compound planetary gear set CPG may be a fourth-second ring gear R4-2 as shown in FIG. 1, or may be a fifth ring gear R5 as shown in FIG. 2. The third carrier CR3 may be selectively connected to the fourth-second ring gear R4-2 or the fifth ring gear R5 by a friction 25 element. The third rotation element of the third planetary gear unit PG3 may be connected to the first rotation element of the compound planetary gear set CPG. For example, the third rotation element of the third planetary gear unit PG3 may be a third ring gear R3, and the first rotation element of the compound planetary gear set CPG may be a fourth sun gear S4. The third ring gear R3 may be directly connected to the fourth sun gear S4.

The second rotation element of the compound planetary gear set CPG may be directly connected to an output shaft OUTPUT. For example, the fourth carrier CR4 may be directly connected to the output shaft OUTPUT as shown in FIG. 1. Alternatively, the fourth and fifth carriers CR4 and CR5 may be directly connected to the output shaft OUTPUT as shown in FIG. 2.

In the vehicle transmission having the above structure, the first planetary gear unit PG1, the second planetary gear unit PG2, the third planetary gear unit PG3, and the compound planetary gear set CPG may be sequentially arranged in the axial direction of the input and output shafts INPUT and OUTPUT. In addition, the transmission according to the first exemplary embodiment of the present invention may further include a plurality of friction elements that are connected to at least one of the rotation elements of the planetary gear units to adjust the rotation of the connected rotation element. The friction elements may be first and second brakes B1 and B2 and first, second, third, and fourth clutches C1, C2, C3, and C4.

In particular, the first brake B1 may be selectively connected between the first sun gear S1, which is the first rotation element of the first planetary gear unit PG1, and the transmission case CS. The second brake B2 may be selectively connected between the first ring gear R1, which is the third rotation element of the first planetary gear unit PG1, and the transmission case CS. The first clutch C1 may be selectively connected between the second carrier CR2, which is the second rotation element of the second planetary gear unit PG2, and the fourth sun gear S4, which is the first rotation element of the compound planetary gear set CPG. The second clutch C2 may be selectively connected between the second ring gear R2, which is the third rotation element of the second planetary gear unit PG2, and the third carrier CR3, which is the second rotation element of the third planetary gear unit PG3.

The third clutch C3 may be selectively connected between the third carrier CR3, which is the second rotation element of the third planetary gear unit PG3, and the fourth-second ring gear R4-2 or the fifth ring gear R5, which is the fourth rotation element of the compound planetary gear set CPG. The fourth clutch C4 may be selectively connected between the second ring gear R2, which is the third rotation element of the second planetary gear unit PG2, and the third sun gear S3, which is the first rotation element of the third planetary gear unit PG3.

Meanwhile, in the structure of the vehicle transmission according to the first exemplary embodiment of the present invention, the rotation elements of the planetary gear units may be connected to the input shaft INPUT, first to eighth shafts A1 to A8, and the output shaft OUTPUT. Referring to FIGS. 1 and 2, the input shaft INPUT may be connected to the second rotation element of the second planetary gear unit PG2, and a first end of the first clutch C1.

The first shaft A1 may be connected to the first brake B1, the first rotation element of the first planetary gear unit PG1, and the first rotation element of the second planetary gear unit PG2. The second shaft A2 may be connected to the second brake B2, and the third rotation element of the first planetary gear unit PG1. The third shaft A3 may be connected to the second rotation element of the first planetary gear unit PG1, and the third rotation element of the compound planetary gear set CPG. The fourth shaft A4 may be connected to a second end of the first clutch C1, the third rotation element of the third planetary gear unit PG3, and the first rotation element of the compound planetary gear set.

The fifth shaft A5 may be connected to the third rotation element of the second planetary gear unit PG2, a first end of the second clutch C2, and a first end of the fourth clutch C4. The sixth shaft A6 may be connected to a second end of the fourth clutch C4, and the first rotation element of the third planetary gear unit PG3. The seventh shaft A7 may be connected to a second end of the second clutch C2, the second rotation element of the third planetary gear unit PG3, and a first end of the third clutch C3. The eighth shaft A8 may be connected to a second end of the third clutch C3, and the fourth rotation element of the compound planetary gear set CPG. The output shaft OUTPUT may be connected to the second rotation element of the compound planetary gear set CPG. The transmission case CS may be connected to the first and second brakes B1 and B2.

For example, the first brake B1 may be selectively connected between the first shaft A1 and the transmission case CS, the second brake B2 may be selectively connected between the second shaft A2 and the transmission case CS, and the first clutch C1 may be selectively connected between the input shaft INPUT and the fourth shaft A4. The second clutch C2 may be selectively connected between the fifth shaft A5 and the seventh shaft A7, the third clutch C3 may be selectively connected between the seventh shaft A7 and the eighth shaft A8, and the fourth clutch C4 may be selectively connected between the fifth shaft A5 and the sixth shaft A6.

Figure 3:
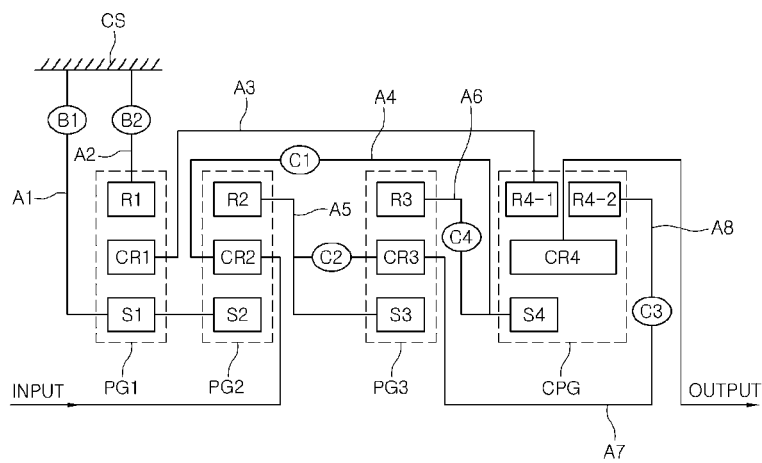
FIG. 3 is a diagram illustrating a structure of a vehicle transmission according to a second exemplary embodiment of the present invention.

FIG. 3 is a diagram illustrating a structure of a vehicle transmission according to a second exemplary embodiment of the present invention. Referring to the drawing, a first rotation element of a first planetary gear unit PG1 may be selectively operated as a fixed element and be directly connected to a first rotation element of a second planetary gear unit PG2. For example, the first rotation element of the first planetary gear unit PG1 may be a first sun gear S1, and the first sun gear S1 may be selectively connected to a transmission case CS by a friction element.

The first rotation element of the second planetary gear unit PG2 may be a second sun gear S2, and the first sun gear S1 may be directly connected to the second sun gear S2. In particular, the first and second planetary gear units PG1 and PG2 and a third planetary gear unit PG3 to be described later may each be a single pinion planetary gear unit. The respective first rotation elements of the gear units may be first, second, and third sun gears, the respective second rotation elements of the gear units may be first, second, and third carriers, and the respective third rotation elements of the gear units may be first, second, and third ring gears.

In addition, the second rotation element of the first planetary gear unit PG1 may be directly connected to a third rotation element of a compound planetary gear set CPG. For example, the second rotation element of the first planetary gear unit PG1 may be a first carrier CR1. The third rotation element of the compound planetary gear set CPG may be a fourth-first ring gear R4-1 as shown in FIG. 3, or may be a fourth ring gear R4 in the case of FIG. 4. The first carrier CR1 may be directly connected to the fourth-first ring gear R4-1 or the fourth ring gear R4.

The third rotation element of the first planetary gear unit PG1 may be selectively operated as a fixed element. For example, the third rotation element of the first planetary gear unit PG1 may be a first ring gear R1, and the first ring gear R1 may be selectively connected to the transmission case CS by a friction element. The second rotation element of the second planetary gear unit PG2 may be directly connected to an input shaft INPUT, and may be selectively connected to the first rotation element of the compound planetary gear set CPG. For example, the second rotation element of the second planetary gear unit PG2 may be a second carrier CR2, and be directly connected to the input shaft INPUT to be operated as an input element.

The first rotation element of the compound planetary gear set CPG may be a fourth sun gear S4, and the second carrier CR2 may be selectively connected to the fourth sun gear S4 by a friction element. The third rotation element of the second planetary gear unit PG2 may be directly connected to the first rotation element of the third planetary gear unit PG3, and the third rotation element of the second planetary gear unit PG2 may be selectively connected to the second rotation element of the third planetary gear unit PG3. For example, the third rotation element of the second planetary gear unit PG2 may be a second ring gear R2, and the first rotation element of the third planetary gear unit PG3 may be a third sun gear S3. The second ring gear R2 may be directly connected to the third sun gear S3.

Figure 4:
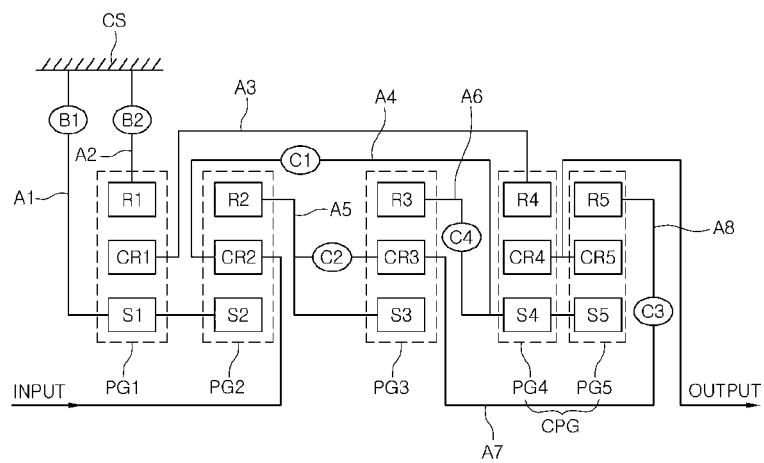
FIG. 4 is a diagram illustrating a modified structure of a compound planetary gear set in the structure of the second exemplary embodiment of the present invention illustrated in FIG. 3.

In addition, the second rotation element of the third planetary gear unit PG3 may be a third carrier CR3, and the second ring gear R2 may be selectively connected to the third carrier CR3 by a friction element. The second rotation element of the third planetary gear unit PG3 may be selectively connected to the fourth rotation element of the compound planetary gear set CPG. For example, the fourth rotation element of the compound planetary gear set CPG may be a fourth-second ring gear R4-2 as shown in FIG. 3, or may be a fifth ring gear R5 as shown in FIG. 4. The third carrier CR3 may be selectively connected to the fourth-second ring gear R4-2 or the fifth ring gear R5 by a friction element.

The third rotation element of the third planetary gear unit PG3 may be selectively connected to the first rotation element of the compound planetary gear set CPG. For example, the third rotation element of the third planetary gear unit PG3 may be a third ring gear R3, and the first rotation element of the compound planetary gear set CPG may be a fourth sun gear S4. The third ring gear R3 may be selectively connected to the fourth sun gear S4 by a friction element. The second rotation element of the compound planetary gear set CPG may be directly connected to an output shaft OUTPUT. For example, the fourth carrier CR4 may be directly connected to the output shaft OUTPUT as shown in FIG. 3. Alternatively, the fourth and fifth carriers CR4 and CR5 may be directly connected to the output shaft OUTPUT in the case of FIG. 4.

In the vehicle transmission having the above structure, the first planetary gear unit PG1, the second planetary gear unit PG2, the third planetary gear unit PG3, and the compound planetary gear set CPG may be sequentially arranged in the axial direction of the input and output shafts INPUT and OUTPUT. In addition, the transmission according to the second exemplary embodiment of the present invention may further include a plurality of friction elements connected to at least one of the rotation elements of the planetary gear units to adjust the rotation of the connected rotation element. The friction elements may be first and second brakes B1 and B2 and first, second, third, and fourth clutches C1, C2, C3, and C4.

In particular, the first brake B1 may be selectively connected between the first sun gear S1, which is the first rotation element of the first planetary gear unit PG1, and the transmission case CS. The second brake B2 may be selectively connected between the first ring gear R1, which is the third rotation element of the first planetary gear unit PG1, and the transmission case CS. The first clutch C1 may be selectively connected between the second carrier CR2, which is the second rotation element of the second planetary gear unit PG2, and the fourth sun gear S4, which is the first rotation element of the compound planetary gear set CPG.

The second clutch C2 may be selectively connected between the second ring gear R2, which is the third rotation element of the second planetary gear unit PG2, and the third carrier CR3, which is the second rotation element of the third planetary gear unit PG3. The third clutch C3 may be selectively connected between the third carrier CR3, which is the second rotation element of the third planetary gear unit PG3, and the fourth-second ring gear R4-2 or the fifth ring gear R5, which is the fourth rotation element of the compound planetary gear set CPG. The fourth clutch C4 may be selectively connected between the third ring gear R3, which is the third rotation element of the third planetary gear unit PG3, and the fourth sun gear S4, which is the first rotation element of the compound planetary gear set CPG.

Meanwhile, in the structure of the vehicle transmission according to the second exemplary embodiment of the present invention, the rotation elements of the planetary gear units may be connected to the input shaft INPUT, first to eighth shafts A1 to A8, and the output shaft OUTPUT. Referring to FIGS. 3 and 4, the input shaft INPUT may be connected to the second rotation element of the second planetary gear unit PG2, and a first end of the first clutch C1.

The first shaft A1 may be connected to the first brake B1, the first rotation element of the first planetary gear unit PG1, and the first rotation element of the second planetary gear unit PG2. The second shaft A2 may be connected to the second brake B2, and the third rotation element of the first planetary gear unit PG1. The third shaft A3 may be connected to the second rotation element of the first planetary gear unit PG1, and the third rotation element of the compound planetary gear set CPG. The fourth shaft A4 may be connected to a second end of the first clutch C1, one end of the fourth clutch C4, and the first rotation element of the compound planetary gear set CPG.

The fifth shaft A5 may be connected to the third rotation element of the second planetary gear unit PG2, a first end of the second clutch C2, and the first rotation element of the third planetary gear unit PG3. The sixth shaft A6 may be connected to the third rotation element of the third planetary gear unit PG3, and a second end of the fourth clutch C4. The seventh shaft A7 may be connected to a second end of the second clutch C2, the second rotation element of the third planetary gear unit PG3, and a first end of the third clutch C3. The eighth shaft A8 may be connected to a second end of the third clutch C3, and the fourth rotation element of the compound planetary gear set CPG. The output shaft OUTPUT may be connected to the second rotation element of the compound planetary gear set CPG. The transmission case CS may be connected to the first and second brakes B1 and B2.

For example, the first brake B1 may be selectively connected between the first shaft A1 and the transmission case CS, the second brake B2 may be selectively connected between the second shaft A2 and the transmission case CS, and the first clutch C1 may be selectively connected between the input shaft INPUT and the fourth shaft A4. The second clutch C2 may be selectively connected between the fifth shaft A5 and the seventh shaft A7, the third clutch C3 may be selectively connected between the seventh shaft A7 and the eighth shaft A8, and the fourth clutch C4 may be selectively connected between the fourth shaft A4 and the sixth shaft A6.

Figure 5:
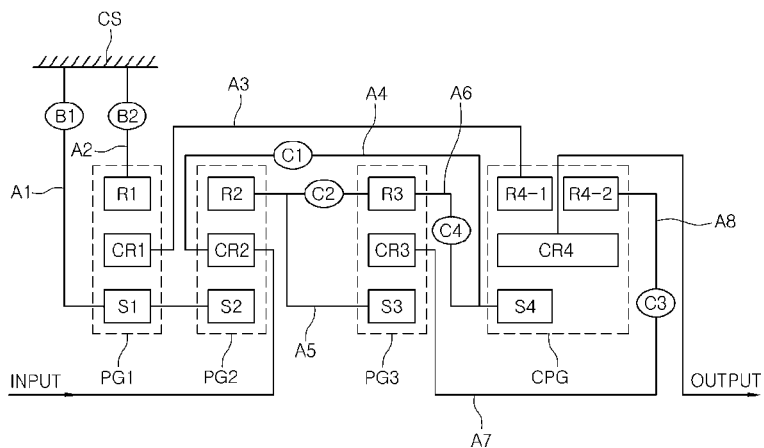
FIG. 5 is a diagram illustrating a structure of a vehicle transmission according to a third exemplary embodiment of the present invention.

FIG. 5 is a diagram illustrating a structure of a vehicle transmission according to a third exemplary embodiment of the present invention. Referring to the drawing, a first rotation element of a first planetary gear unit PG1 may be selectively operated as a fixed element and be directly connected to a first rotation element of a second planetary gear unit PG2. For example, the first rotation element of the first planetary gear unit PG1 may be a first sun gear S1, and the first sun gear S1 may be intermittently connected to a transmission case CS by a friction element.

The first rotation element of the second planetary gear unit PG2 may be a second sun gear S2, and the first sun gear S1 may be directly connected to the second sun gear S2. In particular, the first and second planetary gear units PG1 and PG2 and a third planetary gear unit PG3 to be described later may each be a single pinion planetary gear unit. The respective first rotation elements of the gear units may be first, second, and third sun gears, their respective second rotation elements may be first, second, and third carriers, and their respective third rotation elements may be first, second, and third ring gears.

Figure 6:
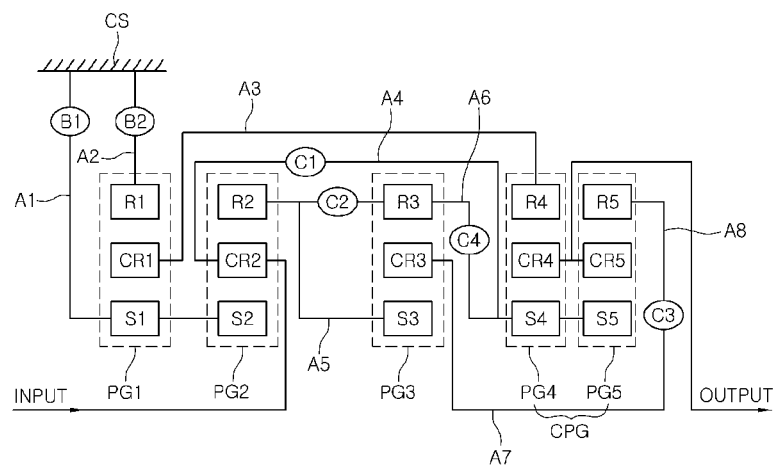
FIG. 6 is a diagram illustrating a modified structure of a compound planetary gear set in the structure of the third exemplary embodiment of the present invention illustrated in FIG. 5.

In addition, the second rotation element of the first planetary gear unit PG1 may be directly connected to a third rotation element of a compound planetary gear set CPG. For example, the second rotation element of the first planetary gear unit PG1 may be a first carrier CR1. The third rotation element of the compound planetary gear set CPG may be a fourth-first ring gear R4-1 as shown in FIG. 5, or may be a fourth ring gear R4 as shown in FIG. 6. The first carrier CR1 may be directly connected to the fourth-first ring gear R4-1 or the fourth ring gear R4.

The third rotation element of the first planetary gear unit PG1 may be selectively operated as a fixed element. For example, the third rotation element of the first planetary gear unit PG1 may be a first ring gear R1, and the first ring gear R1 may be selectively connected to the transmission case CS by a friction element. The second rotation element of the second planetary gear unit PG2 may be directly connected to an input shaft INPUT, and may be selectively connected to the first rotation element of the compound planetary gear set CPG. For example, the second rotation element of the second planetary gear unit PG2 may be a second carrier CR2, and be directly connected to the input shaft INPUT to be operated as an input element.

The first rotation element of the compound planetary gear set CPG may be a fourth sun gear S4, and the second carrier CR2 may be selectively connected to the fourth sun gear S4 by a friction element. The third rotation element of the second planetary gear unit PG2 may be connected to the first rotation element of the third planetary gear unit PG3, and the third rotation element of the second planetary gear unit PG2 may be selectively connected to the third rotation element of the third planetary gear unit PG3. For example, the third rotation element of the second planetary gear unit PG2 may be a second ring gear R2, and the first rotation element of the third planetary gear unit PG3 may be a third sun gear S3. The second ring gear R2 may be directly connected to the third sun gear S3.

In addition, the third rotation element of the third planetary gear unit PG3 may be a third ring gear R3, and the second ring gear R2 may be selectively connected to the third ring gear R3 by a friction element. The second rotation element of the third planetary gear unit PG3 may be selectively connected to the fourth rotation element of the compound planetary gear set CPG. For example, the fourth rotation element of the compound planetary gear set CPG may be a fourth-second ring gear R4-2 as shown in FIG. 5, or may be a fifth ring gear R5 as shown in FIG. 6. The third carrier CR3 may be selectively connected to the fourth-second ring gear R4-2 or the fifth ring gear R5 by a friction element.

The third rotation element of the third planetary gear unit PG3 may be selectively connected to the first rotation element of the compound planetary gear set CPG. For example, the third rotation element of the third planetary gear unit PG3 may be a third ring gear R3, and the first rotation element of the compound planetary gear set CPG may be a fourth sun gear S4. The third ring gear R3 may be selectively connected to the fourth sun gear S4 by a friction element. The second rotation element of the compound planetary gear set CPG may be directly connected to an output shaft OUTPUT. For example, the fourth carrier CR4 may be directly connected to the output shaft OUTPUT as shown in FIG. 5. Alternatively, the fourth and fifth carriers CR4 and CR5 may be directly connected to the output shaft OUTPUT as shown in FIG. 6.

In the vehicle transmission having the above structure, the first planetary gear unit PG1, the second planetary gear unit PG2, the third planetary gear unit PG3, and the compound planetary gear set CPG may be sequentially arranged in the axial direction of the input and output shafts INPUT and OUTPUT. In addition, the transmission according to the third exemplary embodiment of the present invention may further include a plurality of friction elements connected to at least one of the rotation elements of the planetary gear units to adjust the rotation of the connected rotation element. The friction elements may be first and second brakes B1 and B2 and first, second, third, and fourth clutches C1, C2, C3, and C4.

In particular, the first brake B1 may be selectively connected between the first sun gear S1, which is the first rotation element of the first planetary gear unit PG1, and the transmission case CS. The second brake B2 may be selectively connected between the first ring gear R1, which is the third rotation element of the first planetary gear unit PG1, and the transmission case CS. The first clutch C1 may be selectively connected between the second carrier CR2, which is the second rotation element of the second planetary gear unit PG2, and the fourth sun gear S4, which is the first rotation element of the compound planetary gear set CPG.

The second clutch C2 may be selectively connected between the second ring gear R2, which is the third rotation element of the second planetary gear unit PG2, and the third ring gear R3, which is the third rotation element of the third planetary gear unit PG3. The third clutch C3 may be selectively connected between the third carrier CR3, which is the second rotation element of the third planetary gear unit PG3, and the fourth-second ring gear R4-2 or the fifth ring gear R5, which is the fourth rotation element of the compound planetary gear set CPG. The fourth clutch C4 may be selectively connected between the third ring gear R3, which is the third rotation element of the third planetary gear unit PG3, and the fourth sun gear S4, which is the first rotation element of the compound planetary gear set CPG.

Meanwhile, in the structure of the vehicle transmission according to the third exemplary embodiment of the present invention, the rotation elements of the planetary gear units may be connected to the input shaft INPUT, first to eighth shafts A1 to A8, and the output shaft OUTPUT. Referring to FIGS. 5 and 6, the input shaft INPUT may be connected to the second rotation element of the second planetary gear unit PG2, and a first end of the first clutch C1.

The first shaft A1 may be connected to the first brake B1, the first rotation element of the first planetary gear unit PG1, and the first rotation element of the second planetary gear unit PG2. The second shaft A2 may be connected to the second brake B2, and the third rotation element of the first planetary gear unit PG1. The third shaft A3 may be connected to the second rotation element of the first planetary gear unit PG1, and the third rotation element of the compound planetary gear set CPG. The fourth shaft A4 may be connected to a second end of the first clutch C1, a first end of the fourth clutch C4, and the first rotation element of the compound planetary gear set.

The fifth shaft A5 may be connected to the third rotation element of the second planetary gear unit PG2, a first end of the second clutch C2, and the first rotation element of the third planetary gear unit PG3. The sixth shaft A6 may be connected to a second end of the second clutch C2, the third rotation element of the third planetary gear unit PG3, and a second end of the fourth clutch C4. The seventh shaft A7 may be connected to the second rotation element of the third planetary gear unit PG3, and a first end of the third clutch C3. The eighth shaft A8 may be connected to a second end of the third clutch C3, and the fourth rotation element of the compound planetary gear set CPG. The output shaft OUTPUT may be connected to the second rotation element of the compound planetary gear set CPG. The transmission case CS may be connected to the first and second brakes B1 and B2.

For example, the first brake B1 may be selectively connected between the first shaft A1 and the transmission case CS, the second brake B2 may be selectively connected between the second shaft A2 and the transmission case CS, and the first clutch C1 may be selectively connected between the input shaft INPUT and the fourth shaft A4. The second clutch C2 may be selectively connected between the fifth shaft A5 and the sixth shaft A6, the third clutch C3 may be selectively connected between the seventh shaft A7 and the eighth shaft A8, and the fourth clutch C4 may be selectively connected between the fourth shaft A4 and the sixth shaft A6.

Figure 7:
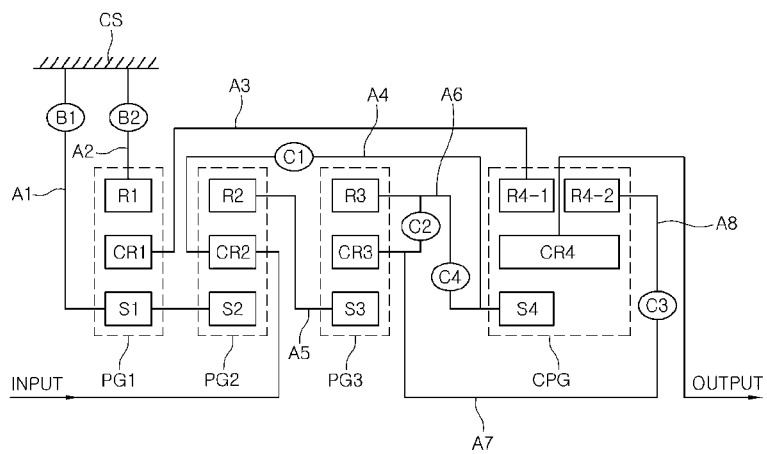
FIG. 7 is a diagram illustrating a structure of a vehicle transmission according to a fourth exemplary embodiment of the present invention.

FIG. 7 is a diagram illustrating a structure of a vehicle transmission according to a fourth exemplary embodiment of the present invention. Referring to the drawing, a first rotation element of a first planetary gear unit PG1 may be selectively operated as a fixed element and be directly connected to a first rotation element of a second planetary gear unit PG2. For example, the first rotation element of the first planetary gear unit PG1 may be a first sun gear S1, and the first sun gear S1 may be selectively connected to a transmission case CS by a friction element.

The first rotation element of the second planetary gear unit PG2 may be a second sun gear S2, and the first sun gear S1 may be directly connected to the second sun gear S2. In particular, the first and second planetary gear units PG1 and PG2 and a third planetary gear unit PG3 to be described later may each be a single pinion planetary gear unit. The respective first rotation elements of the gear units may be first, second, and third sun gears, the respective second rotation elements of the gear units may be first, second, and third carriers, and the respective third rotation elements of the gear units may be first, second, and third ring gears.

Figure 8:
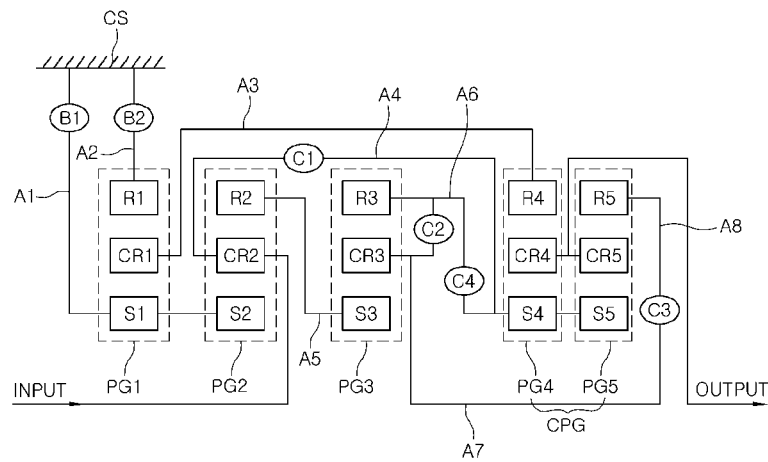
FIG. 8 is a diagram illustrating a modified structure of a compound planetary gear set in the structure of the fourth exemplary embodiment of the present invention illustrated in FIG. 7.

In addition, the second rotation element of the first planetary gear unit PG1 may be directly connected to a third rotation element of a compound planetary gear set CPG. For example, the second rotation element of the first planetary gear unit PG1 may be a first carrier CR1. The third rotation element of the compound planetary gear set CPG may be a fourth-first ring gear R4-1 as shown in FIG. 7, or may be a fourth ring gear R4 as shown in FIG. 8. The first carrier CR1 may be directly connected to the fourth-first ring gear R4-1 or the fourth ring gear R4.

The third rotation element of the first planetary gear unit PG1 may be selectively operated as a fixed element. For example, the third rotation element of the first planetary gear unit PG1 may be a first ring gear R1, and the first ring gear R1 may be selectively connected to the transmission case CS by a friction element. The second rotation element of the second planetary gear unit PG2 may be directly connected to an input shaft INPUT, and may be selectively connected to the first rotation element of the compound planetary gear set CPG. For example, the second rotation element of the second planetary gear unit PG2 may be a second carrier CR2, and be directly connected to the input shaft INPUT to be operated as an input element.

The first rotation element of the compound planetary gear set CPG may be a fourth sun gear S4, and the second carrier CR2 may be selectively connected to the fourth sun gear S4 by a friction element. The third rotation element of the second planetary gear unit PG2 may be connected to the first rotation element of the third planetary gear unit PG3. For example, the third rotation element of the second planetary gear unit PG2 may be a second ring gear R2, and the first rotation element of the third planetary gear unit PG3 may be a third sun gear S3. The second ring gear R2 may be directly connected to the third sun gear S3.

The second rotation element of the third planetary gear unit PG3 may be selectively connected to the fourth rotation element of the compound planetary gear set CPG. For example, the fourth rotation element of the compound planetary gear set CPG may be a fourth-second ring gear R4-2 as shown in FIG. 7, or may be a fifth ring gear R5 as shown in FIG. 8. The third carrier CR3 may be selectively connected to the fourth-second ring gear R4-2 or the fifth ring gear R5 by a friction element. The second rotation element of the third planetary gear unit PG3 may be connected to the third rotation element of the third planetary gear unit PG3. For example, the second rotation element of the third planetary gear unit PG3 may be a third carrier CR3, and the third rotation element of the third planetary gear unit PG3 may be a third ring gear R3. The third carrier CR3 may be selectively connected to the third ring gear R3 by a friction element.

In addition, the third rotation element of the third planetary gear unit PG3 may be selectively connected to the first rotation element of the compound planetary gear set CPG. For example, the third rotation element of the third planetary gear unit PG3 may be a third ring gear R3, and the first rotation element of the compound planetary gear set CPG may be a fourth sun gear S4. The third ring gear R3 may be selectively connected to the fourth sun gear S4 by a friction element. The second rotation element of the compound planetary gear set CPG may be directly connected to an output shaft OUTPUT. For example, the fourth carrier CR4 may be directly connected to the output shaft OUTPUT as shown in FIG. 7. Alternatively, the fourth and fifth carriers CR4 and CR5 may be directly connected to the output shaft OUTPUT as shown in FIG. 8.

In the vehicle transmission having the above structure, the first planetary gear unit PG1, the second planetary gear unit PG2, the third planetary gear unit PG3, and the compound planetary gear set CPG may be sequentially arranged in the axial direction of the input and output shafts INPUT and OUTPUT. In addition, the transmission according to the fourth exemplary embodiment of the present invention may further include a plurality of friction elements connected to at least one of the rotation elements of the planetary gear units to adjust the rotation of the connected rotation element. The friction elements may be first and second brakes B1 and B2 and first, second, third, and fourth clutches C1, C2, C3, and C4.

In particular, the first brake B1 may be selectively connected between the first sun gear S1, which is the first rotation element of the first planetary gear unit PG1, and the transmission case CS. The second brake B2 may be selectively connected between the first ring gear R1, which is the third rotation element of the first planetary gear unit PG1, and the transmission case CS. The first clutch C1 may be selectively connected between the second carrier CR2, which is the second rotation element of the second planetary gear unit PG2, and the fourth sun gear S4, which is the first rotation element of the compound planetary gear set CPG.

The second clutch C2 may be selectively connected between the third carrier CR3, which is the second rotation element of the third planetary gear unit PG3, and the third ring gear R3, which is the third rotation element of the third planetary gear unit PG3. The third clutch C3 may be selectively connected between the third carrier CR3, which is the second rotation element of the third planetary gear unit PG3, and the fourth-second ring gear R4-2 or the fifth ring gear R5, which is the fourth rotation element of the compound planetary gear set CPG. The fourth clutch C4 may be selectively connected between the third ring gear R3, which is the third rotation element of the third planetary gear unit PG3, and the fourth sun gear S4, which is the first rotation element of the compound planetary gear set CPG.

Meanwhile, in the structure of the vehicle transmission according to the fourth exemplary embodiment of the present invention, the rotation elements of the planetary gear units may be connected to the input shaft INPUT, first to eighth shafts A1 to A8, and the output shaft OUTPUT. Referring to FIGS. 7 and 8, the input shaft INPUT may be connected to the second rotation element of the second planetary gear unit PG2, and a first end of the first clutch C1.

The first shaft A1 may be connected to the first brake B1, the first rotation element of the first planetary gear unit PG1, and the first rotation element of the second planetary gear unit PG2. The second shaft A2 may be connected to the second brake B2, and the third rotation element of the first planetary gear unit PG1. The third shaft A3 may be connected to the second rotation element of the first planetary gear unit PG1, and the third rotation element of the compound planetary gear set CPG. The fourth shaft A4 may be connected to a second end of the first clutch C1, a first end of the fourth clutch C4, and the first rotation element of the compound planetary gear set CPG.

The fifth shaft A5 may be connected to the third rotation element of the second planetary gear unit PG2, and the first rotation element of the third planetary gear unit PG3. The sixth shaft A6 may be connected to the third rotation element of the third planetary gear unit PG3, a first end of the second clutch C2, and a second end of the fourth clutch C4. The seventh shaft A7 may be connected to the second rotation element of the third planetary gear unit PG3, a second end of the second clutch C2, and a first end of the third clutch C3. The eighth shaft A8 may be connected to a second end of the third clutch C3, and the fourth rotation element of the compound planetary gear set CPG. The output shaft OUTPUT may be connected to the second rotation element of the compound planetary gear set CPG. The transmission case CS may be connected to the first and second brakes B1 and B2.

For example, the first brake B1 may be selectively connected between the first shaft A1 and the transmission case CS, the second brake B2 may be selectively connected between the second shaft A2 and the transmission case CS, and the first clutch C1 may be selectively connected between the input shaft INPUT and the fourth shaft A4. The second clutch C2 may be selectively connected between the sixth shaft A6 and the seventh shaft A7, the third clutch C3 may be selectively connected between the seventh shaft A7 and the eighth shaft A8, and the fourth clutch C4 may be selectively connected between the fourth shaft A4 and the sixth shaft A6.

Figure 9:
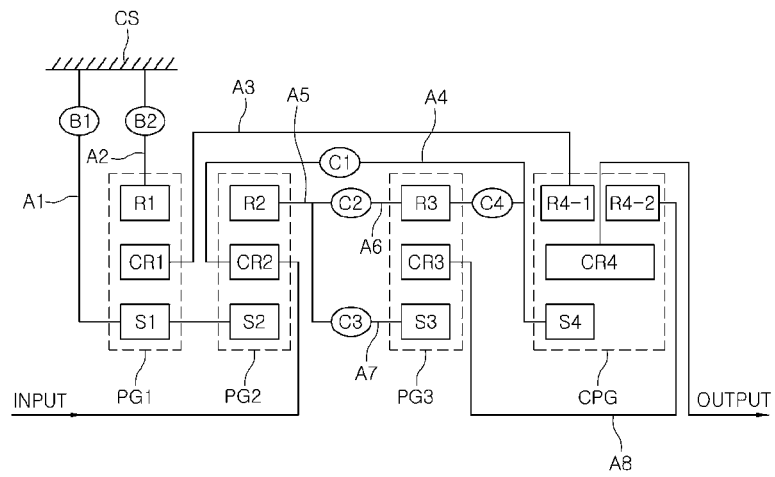
FIG. 9 is a diagram illustrating a structure of a vehicle transmission according to a fifth exemplary embodiment of the present invention.

FIG. 9 is a diagram illustrating a structure of a vehicle transmission according to a fifth exemplary embodiment of the present invention. Referring to the drawing, a first rotation element of a first planetary gear unit PG1 may be selectively operated as a fixed element and be directly connected to a first rotation element of a second planetary gear unit PG2. For example, the first rotation element of the first planetary gear unit PG1 may be a first sun gear S1, and the first sun gear S1 may be selectively connected to a transmission case CS by a friction element. The first rotation element of the second planetary gear unit PG2 may be a second sun gear S2, and the first sun gear S1 may be directly connected to the second sun gear S2. In particular, the first and second planetary gear units PG1 and PG2 and a third planetary gear unit PG3 to be described later may each be a single pinion planetary gear unit. The respective first rotation elements of the gear units may be first, second, and third sun gears, the respective second rotation elements of the gear units may be first, second, and third carriers, and the respective third rotation elements of the gear units may be first, second, and third ring gears.

Figure 10:
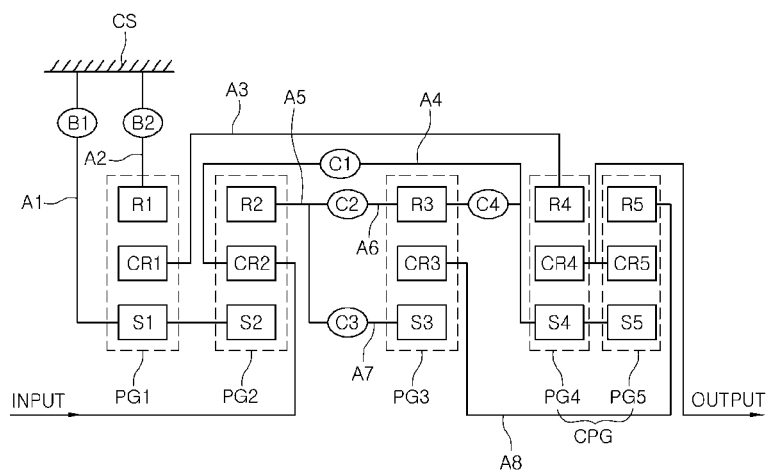
FIG. 10 is a diagram illustrating a modified structure of a compound planetary gear set in the structure of the fifth exemplary embodiment of the present invention illustrated in FIG. 9.

In addition, the second rotation element of the first planetary gear unit PG1 may be directly connected to a third rotation element of a compound planetary gear set CPG. For example, the second rotation element of the first planetary gear unit PG1 may be a first carrier CR1. The third rotation element of the compound planetary gear set CPG may be a fourth-first ring gear R4-1 as shown in FIG. 9, or may be a fourth ring gear R4 as shown in FIG. 10. The first carrier CR1 may be directly connected to the fourth-first ring gear R4-1 or the fourth ring gear R4.

The third rotation element of the first planetary gear unit PG1 may be selectively operated as a fixed element. For example, the third rotation element of the first planetary gear unit PG1 may be a first ring gear R1, and the first ring gear R1 may be selectively connected to the transmission case CS by a friction element. The second rotation element of the second planetary gear unit PG2 may be directly connected to an input shaft INPUT, and may be selectively connected to the first rotation element of the compound planetary gear set CPG. For example, the second rotation element of the second planetary gear unit PG2 may be a second carrier CR2, and be directly connected to the input shaft INPUT to be operated as an input element.

The first rotation element of the compound planetary gear set CPG may be a fourth sun gear S4, and the second carrier CR2 may be selectively connected to the fourth sun gear S4 by a friction element. The third rotation element of the second planetary gear unit PG2 may be selectively connected to the first rotation element of the third planetary gear unit PG3, and the third rotation element of the second planetary gear unit PG2 may be selectively connected to the third rotation element of the third planetary gear unit PG3. For example, the third rotation element of the second planetary gear unit PG2 may be a second ring gear R2, and the first rotation element of the third planetary gear unit PG3 may be a third sun gear S3. The second ring gear R2 may be selectively connected to the third sun gear S3 by a friction element.

In addition, the third rotation element of the third planetary gear unit PG3 may be a third ring gear R3, and the second ring gear R2 may be selectively connected to the third ring gear R3 by a friction element. The second rotation element of the third planetary gear unit PG3 may be connected to the fourth rotation element of the compound planetary gear set CPG. For example, the fourth rotation element of the compound planetary gear set CPG may be a fourth-second ring gear R4-2 as shown in FIG. 9, or may be a fifth ring gear R5 as shown in FIG. 10. The third carrier CR3 may be directly connected to the fourth-second ring gear R4-2 or the fifth ring gear R5.

The third rotation element of the third planetary gear unit PG3 may be selectively connected to the first rotation element of the compound planetary gear set CPG. For example, the third rotation element of the third planetary gear unit PG3 may be a third ring gear R3, and the first rotation element of the compound planetary gear set CPG may be a fourth sun gear S4. The third ring gear R3 may be selectively connected to the fourth sun gear S4 by a friction element.

The second rotation element of the compound planetary gear set CPG may be directly connected to an output shaft OUTPUT. For example, the fourth carrier CR4 may be directly connected to the output shaft OUTPUT as shown in FIG. 9. Alternatively, the fourth and fifth carriers CR4 and CR5 may be directly connected to the output shaft OUTPUT as shown in FIG. 10. In the vehicle transmission having the above structure, the first planetary gear unit PG1, the second planetary gear unit PG2, the third planetary gear unit PG3, and the compound planetary gear set CPG may be sequentially arranged in the axial direction of the input and output shafts INPUT and OUTPUT.

In addition, the transmission according to the fifth exemplary embodiment of the present invention may further include a plurality of friction elements connected to at least one of the rotation elements of the planetary gear units to adjust the rotation of the connected rotation element. The friction elements may be first and second brakes B1 and B2 and first, second, third, and fourth clutches C1, C2, C3, and C4.

In particular, the first brake B1 may be selectively connected between the first sun gear S1, which is the first rotation element of the first planetary gear unit PG1, and the transmission case CS. The second brake B2 may be selectively connected between the first ring gear R1, which is the third rotation element of the first planetary gear unit PG1, and the transmission case CS. The first clutch C1 may be selectively connected between the second carrier CR2, which is the second rotation element of the second planetary gear unit PG2, and the fourth sun gear S4, which is the first rotation element of the compound planetary gear set CPG.

The second clutch C2 may be selectively connected between the second ring gear R2, which is the third rotation element of the second planetary gear unit PG2, and the third ring gear R3, which is the third rotation element of the third planetary gear unit PG3. The third clutch C3 may be selectively connected between the second ring gear R2, which is the third rotation element of the second planetary gear unit PG2, and the third sun gear S3, which is the first rotation element of the third planetary gear unit PG3. The fourth clutch C4 may be selectively connected between the third ring gear R3, which is the third rotation element of the third planetary gear unit PG3, and the fourth sun gear S4, which is the first rotation element of the compound planetary gear set CPG.

Meanwhile, in the structure of the vehicle transmission according to the fifth exemplary embodiment of the present invention, the rotation elements of the planetary gear units may be connected to the input shaft INPUT, first to eighth shafts A1 to A8, and the output shaft OUTPUT. Referring to FIGS. 9 and 10, the input shaft INPUT may be connected to the second rotation element of the second planetary gear unit PG2, and a first end of the first clutch C1.

The first shaft A1 may be connected to the first brake B1, the first rotation element of the first planetary gear unit PG1, and the first rotation element of the second planetary gear unit PG2. The second shaft A2 may be connected to the second brake B2, and the third rotation element of the first planetary gear unit PG1. The third shaft A3 may be connected to the second rotation element of the first planetary gear unit PG1, and the third rotation element of the compound planetary gear set CPG. The fourth shaft A4 may be connected to a second end of the first clutch C1, a second end of the fourth clutch C4, and the first rotation element of the compound planetary gear set CPG.

The fifth shaft A5 may be connected to the third rotation element of the second planetary gear unit PG2, a first end of the second clutch C2, and a first end of the third clutch C3. The sixth shaft A6 may be connected to a second end of the second clutch C2, the third rotation element of the third planetary gear unit PG3, and a second end of the fourth clutch C4. The seventh shaft A7 may be connected to a second end of the third clutch C3, and the first rotation element of the third planetary gear unit PG3. The eighth shaft A8 may be connected to the second rotation element of the third planetary gear unit PG3, and the fourth rotation element of the compound planetary gear set CPG. The output shaft OUTPUT may be connected to the second rotation element of the compound planetary gear set CPG.

The transmission case CS may be connected to the first and second brakes B1 and B2. For example, the first brake B1 may be selectively connected between the first shaft A1 and the transmission case CS, the second brake B2 may be selectively connected between the second shaft A2 and the transmission case CS, and the first clutch C1 may be selectively connected between the input shaft INPUT and the fourth shaft A4. The second clutch C2 may be selectively connected between the fifth shaft A5 and the sixth shaft A6, the third clutch C3 may be selectively connected between the fifth shaft A5 and the seventh shaft A7, and the fourth clutch C4 may be selectively connected between the fourth shaft A4 and the sixth shaft A6.

FIG. 11 is an operation table for each speed stage of the vehicle transmission according to the first to fifth exemplary embodiments of the present invention. In particular, FIG. 11 shows the gear ratios between the clutch, brakes, and the different gear stages based on which components are engaged as described herein below. When the first clutch C1 is engaged in the transmission of all exemplary embodiments, the driving force transmitted to the second carrier CR2 through the input shaft INPUT may be transmitted to the fourth sun gear S4.

When the second and third clutches C2 and C3 are engaged, the driving force transmitted to the second ring gear R2 may be transmitted to the fourth-second ring gear R4-2 or the fifth ring gear R5 via the third carrier CR3. When the second and fourth clutches C2 and C4 are engaged, the driving force transmitted to the second ring gear R2 may be transmitted to the fourth sun gear S4 via the third planetary gear unit PG3 while the third planetary gear unit PG3 rotates.

When the first, second, and fourth clutches C1, C2, and C4 are engaged, the driving force transmitted to the third ring gear R3 may be transmitted to the fourth sun gear S4 while the second and third planetary gear units PG2 and PG3 rotate integrally. When the second, third, and fourth clutches C2, C3, and C4 are engaged, the driving force may be transmitted to the output shaft OUTPUT while the third planetary gear unit PG3 and the compound planetary gear set CPG rotate integrally. When the first, third, and fourth clutches C1, C3, and C4 are engaged, the driving force transmitted to the third carrier CR3 may be transmitted to the fourth-second ring gear R4-2 or the fifth ring gear R5.

Additionally, to form, for example, a 1st-speed gear ratio according to the shift operation, the first clutch C1 and the first and second brakes B1 and B2 may be engaged, and the remaining friction elements may be open. However, although the operation table indicates that one friction element of the second, third, and fourth clutches C2, C3, and C4 may be further engaged when forming the 1st-speed gear ratio, the 1st-speed gear ratio may be formed regardless of whether to engage the second, third, or fourth clutch. In other words, it may be possible to form the 1st-speed gear ratio when three friction elements of the first clutch C1 and the first and second brakes B1 and B2 are engaged regardless of whether to engage the second, third, or fourth clutch C2, C3, or C4.

The second and fourth clutches C2 and C4 have to be engaged to form a 2nd-speed gear ratio at a greater speed stage than the 1st-speed stage as in the operation table of FIG. 11. Accordingly, the reason that the second, third, or fourth clutch is further engaged to form the 1st-speed gear ratio is due to shift performance and response may be improved when shifting gears to the 2nd-speed stage, which is a high speed stage, from the 1st-speed stage, when the second or fourth clutch C2 or C4 are previously engaged at the 1st-speed stage.

In addition, to form a 2nd-speed gear ratio, the first and second brakes B1 and B2 and the second and third clutches C2 and C3 may be engaged, and the remaining friction elements may be open. In the case of other speed stages, it may be possible to form a gear ratio that corresponds to an associated one of the speed stages by the selective intermittence operation of the friction elements as indicated in the operation table, for driving of the vehicle.

As described above, the vehicle transmission according to the present invention may combine three simple planetary gear units with a single compound planetary gear set CPG or combine five simple planetary gear units to shift gears while changing rotational speeds and directions by the selective intermittence operation using the rotation elements of the planetary gear units and the plurality of friction elements. Through such a shift operation, it may be possible to form at least forward 10-speed or more and reverse 1-speed gear ratios for driving of the vehicle. Thus, it may be possible to improve fuel efficiency through multiple speed stages of the automatic transmission and to enhance silent drivability of the vehicle using the operating point in the low RPM range of the engine.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vehicle transmission, comprising:
a first planetary gear unit, a second planetary gear unit, a third planetary gear unit, and a compound planetary gear set, each having three or more rotation elements, wherein:
the first planetary gear unit includes a first rotation element directly connected to a first rotation element of the second planetary gear unit while being selectively operated as a fixed element, a second rotation element directly connected to a third rotation element of the compound planetary gear set, and a third rotation element selectively operated as a fixed element;
the second planetary gear unit includes a second rotation element selectively connected to a first rotation element of the compound planetary gear set while being directly connected to an input shaft; and
the compound planetary gear set includes a second rotation element directly connected to an output shaft,
wherein the vehicle transmission includes a plurality of friction elements connected to at least one of the rotation elements of the planetary gear units to adjust rotation of the connected rotation element.

2. The vehicle transmission according to claim 1, wherein:
in each of the first to third planetary gear units, the first rotation element is a sun gear, the second rotation element is a carrier, and the third rotation element is a ring gear, and
in the compound planetary gear set, the first rotation element is a sun gear, the second rotation element is a carrier, and the third and fourth rotation elements are respective ring gears engaged to the carrier.

3. The vehicle transmission according to claim 2, wherein:
the compound planetary gear set includes a fourth planetary gear unit and a fifth planetary gear unit;
the first rotation element of the compound planetary gear set is configured by directly connecting a sun gear of the fourth planetary gear unit to a sun gear of the fifth planetary gear unit;
the second rotation element of the compound planetary gear set is configured by directly connecting a carrier of the fourth planetary gear unit to a carrier of the fifth planetary gear unit;
the third rotation element of the compound planetary gear set is a ring gear of the fourth planetary gear unit; and
the fourth rotation element of the compound planetary gear set is a ring gear of the fifth planetary gear unit.

4. The vehicle transmission according to claim 1, wherein:
a third rotation element of the second planetary gear unit is selectively connected to a second rotation element of the third planetary gear unit;
the second rotation element of the third planetary gear unit is selectively connected to a fourth rotation element of the compound planetary gear set;
the third rotation element of the second planetary gear unit is selectively connected to a first rotation element of the third planetary gear unit;
a third rotation element of the third planetary gear unit is directly connected to a first rotation element of the compound planetary gear set; and
the second rotation element of the third planetary gear unit is selectively connected to a fourth rotation element of the compound planetary gear set.

5. The vehicle transmission according to claim 4, wherein the friction elements include:
a first brake selectively connected between the first rotation element of the first planetary gear unit and a transmission case;
a second brake selectively connected between the third rotation element of the first planetary gear unit and the transmission case;
a first clutch selectively connected between the second rotation element of the second planetary gear unit and the first rotation element of the compound planetary gear set;

a second clutch selectively connected between the third rotation element of the second planetary gear unit and the second rotation element of the third planetary gear unit;

a third clutch selectively connected between the second rotation element of the third planetary gear unit and the fourth rotation element of the compound planetary gear set; and a fourth clutch selectively connected between the third rotation element of the second planetary gear unit and the first rotation element of the third planetary gear unit.

6. The vehicle transmission according to claim 4, wherein:

the third rotation element of the second planetary gear unit is selectively connected to the second rotation element of the third planetary gear unit.

7. The vehicle transmission according to claim 6, wherein the friction elements include:

a first brake selectively connected between the first rotation element of the first planetary gear unit and a transmission case;

a second brake selectively connected between the third rotation element of the first planetary gear unit and the transmission case;

a first clutch selectively connected between the second rotation element of the second planetary gear unit and the first rotation element of the compound planetary gear set;

a second clutch selectively connected between the third rotation element of the second planetary gear unit and the second rotation element of the third planetary gear unit;

a third clutch selectively connected between the second rotation element of the third planetary gear unit and the fourth rotation element of the compound planetary gear set; and a fourth clutch selectively connected between the third rotation element of the third planetary gear unit and the first rotation element of the compound planetary gear set.

8. The vehicle transmission according to claim 1, wherein:

a third rotation element of the second planetary gear unit is directly connected to a first rotation element of the third planetary gear unit;

the second rotation element of the third planetary gear unit is selectively connected to a fourth rotation element of the compound planetary gear set;

a third rotation element of the third planetary gear unit is selectively connected to a first rotation element of the compound planetary gear set.

9. The vehicle transmission according to claim 8, wherein the third rotation element of the second planetary gear unit is selectively connected to the third rotation element of the third planetary gear unit.

10. The vehicle transmission according to claim 9, wherein the friction elements include:

a first brake selectively connected between the first rotation element of the first planetary gear unit and a transmission case;

a second brake selectively connected between the third rotation element of the first planetary gear unit and the transmission case;

a first clutch selectively connected between the second rotation element of the second planetary gear unit and the first rotation element of the compound planetary gear set;

a second clutch selectively connected between the third rotation element of the second planetary gear unit and the third rotation element of the third planetary gear unit;

a third clutch selectively connected between the second rotation element of the third planetary gear unit and the fourth rotation element of the compound planetary gear set; and a fourth clutch selectively connected between the third rotation element of the third planetary gear unit and the first rotation element of the compound planetary gear set.

11. The vehicle transmission according to claim 6, wherein the second rotation element of the third planetary gear unit is selectively connected to the third rotation element of the third planetary gear unit.

12. The vehicle transmission according to claim 11, wherein the friction elements include: a first brake selectively connected between the first rotation element of the first planetary gear unit and a transmission case;

a second brake selectively connected between the third rotation element of the first planetary gear unit and the transmission case;

a first clutch selectively connected between the second rotation element of the second planetary gear unit and the first rotation element of the compound planetary gear set;

a second clutch selectively connected between the second rotation element of the third planetary gear unit and the third rotation element of the third planetary gear unit;

a third clutch selectively connected between the second rotation element of the third planetary gear unit and the fourth rotation element of the compound planetary gear set; and a fourth clutch selectively connected between the third rotation element of the third planetary gear unit and the first rotation element of the compound planetary gear set.

13. The vehicle transmission according to claim 1, wherein:

a third rotation element of the second planetary gear unit is selectively connected to a first rotation element of the third planetary gear unit;

the third rotation element of the second planetary gear unit is selectively connected to a third rotation element of the third planetary gear unit;

a second rotation element of the third planetary gear unit is directly connected to a fourth rotation element of the compound planetary gear set; and the third rotation element of the third planetary gear unit is selectively connected to a first rotation element of the compound planetary gear set.

14. The vehicle transmission according to claim 13, wherein the friction elements include:

a first brake selectively connected between the first rotation element of the first planetary gear unit and a transmission case;

a second brake selectively connected between the third rotation element of the first planetary gear unit and the transmission case;

a first clutch selectively connected between the second rotation element of the second planetary gear unit and the first rotation element of the compound planetary gear set;

a second clutch selectively connected between the third rotation element of the second planetary gear unit and the third rotation element of the third planetary gear unit;

a third clutch selectively connected between the third rotation element of the second planetary gear unit and the first rotation element of the third planetary gear unit; and a fourth clutch selectively connected between the third rotation element of the third planetary gear unit and the first rotation element of the compound planetary gear set.

* * * * *